(12) United States Patent
Lazzaro

(10) Patent No.: US 11,997,182 B1
(45) Date of Patent: *May 28, 2024

(54) ADAPTIVE SYSTEM AND METHOD FOR DYNAMICALLY ADJUSTING MESSAGE RATES THROUGH A TRANSPORT

(71) Applicant: CSC Holdings, LLC, Bethpage, NY (US)

(72) Inventor: Peter Lazzaro, Great River, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,719

(22) Filed: May 6, 2022

Related U.S. Application Data

(63) Continuation of application No. 16/664,049, filed on Oct. 25, 2019, now Pat. No. 11,330,073, which is a continuation of application No. 14/813,860, filed on Jul. 30, 2015, now Pat. No. 10,506,061.

(51) Int. Cl.
*H04L 29/08* (2006.01)
*H04L 67/1097* (2022.01)
*H04L 67/568* (2022.01)

(52) U.S. Cl.
CPC ........ *H04L 67/568* (2022.05); *H04L 67/1097* (2013.01)

(58) Field of Classification Search
CPC .......................... H04L 67/568; H04L 67/1097
USPC .................................................. 709/201, 213
See application file for complete search history.

(56) References Cited

U.S. PATENT DOCUMENTS

| | | |
|---|---|---|
| 8,336,058 B1 | 12/2012 | Geisinger et al. |
| 8,782,355 B1 | 7/2014 | Jain |
| 9,354,931 B1* | 5/2016 | Ryoo ..................... G06F 9/5061 |
| 2002/0080721 A1* | 6/2002 | Tobagi ................... H04L 47/27 370/236 |
| 2004/0156622 A1 | 8/2004 | Kent, Jr. |
| 2005/0246186 A1* | 11/2005 | Nikolov ............... G06Q 10/107 709/206 |
| 2014/0040903 A1* | 2/2014 | Hsu ....................... G06F 9/5027 718/103 |

OTHER PUBLICATIONS

Exchange2013(Microsoft, TopiclastModified:Mar. 9, 2015htto://technet.microsoft.com/en-us/library/ob125022(v=exchg.150) (Year: 2013).*

Exchange2013(Microsoft, TopicLastModified:Mar. 9, 2015htto://technet.microsoft.com/en-us/library/ob125022(v=exchg. 150) (Year: 2015).*

(Continued)

*Primary Examiner* — Younes Naji
*Assistant Examiner* — Da T Ton
(74) *Attorney, Agent, or Firm* — Sterne, Kessler, Goldstein & Fox P.L.L.C.

(57) ABSTRACT

Disclosed herein is a system and method for dynamically adapting message rates through a transport. The system and method continually operate a transport and analyze trend data using a moving average of a production rate and a consumption rate. Keeping message flow at an optimal rate as system conditions vary throughout time enables efficient delivery of messages through multiple subsystems and intermediary transports to the messages' manifold endpoints.

20 Claims, 5 Drawing Sheets

(56) References Cited

OTHER PUBLICATIONS

Queues, Exchange 2013 (Microsoft, Topic Dated: Mar. 9, 2015, http://technet.microsoft.com/en-us/library/bb125022(v=exchg.150).Aspx#RTT.
Queues, Exchange 2013 (Microsoft, Topic Dated: Jan. 31, 2014, available at https://web.archive.org/web/20150114080051/http://technet.microsoft.com/en-us/library/bb125022(v=exchg.150).Aspx.

* cited by examiner

ADAPTIVE SYSTEM AND METHOD FOR DYNAMICALLY ADJUSTING MESSAGE RATES THROUGH A TRANSPORT

CROSS REFERENCE TO RELATED APPLICATION

This application is a continuation of and claims priority to U.S. Nonprovisional patent application Ser. No. 16/664,049 (U.S. Pat. No. 11,330,073), filed Oct. 25, 2019, which is a continuation of U.S. Nonprovisional patent application Ser. No. 14/813,860 (U.S. Pat. No. 10,506,061), filed Jul. 30, 2015, the contents of which are hereby incorporated herein by reference in their entirety.

BACKGROUND

Field

Embodiments generally relate to managing the flow of data through a transport.

Background

In the age of the internet of things and the rise of big data, efficiently delivering messages flowing through a multitude of subsystems and intermediary transports to manifold endpoints becomes critical. As message rates and data sources increase, the acceptable tolerance of deliverance latency contracts, and keeping transports operating at peak efficiency becomes more important to the information technology industry.

The rates messages arrive at a transport and the rates messages are directed to an appropriate endpoint can greatly vary under existing approaches. The variability can result in a data flow bottleneck. Several important independent variables that impact data flow rates include but are not limited to: network latency, CPU constraints, memory usage, message rates, and message sizes. These variables can create problems to well-structured code, the code's associated threading model, subsystems along the data path, and intermediary transports.

Current systems and methods of managing the flow of data through a transport have drawbacks. For example, current transport systems are not adaptable to proactively correct imbalances. Consequently, system administrators are forced to react to issues in the system, which results in a rush to ameliorate the problem, loss of productivity, loss of revenue, loss of messages, or possible catastrophic failure of the transport system.

BRIEF DESCRIPTION OF THE DRAWINGS

The accompanying drawings are included to provide further understanding, are incorporated in and constitute a part of this specification, and illustrate embodiments that, together with the description, serve to explain the principles of the technology.

Figure 1:
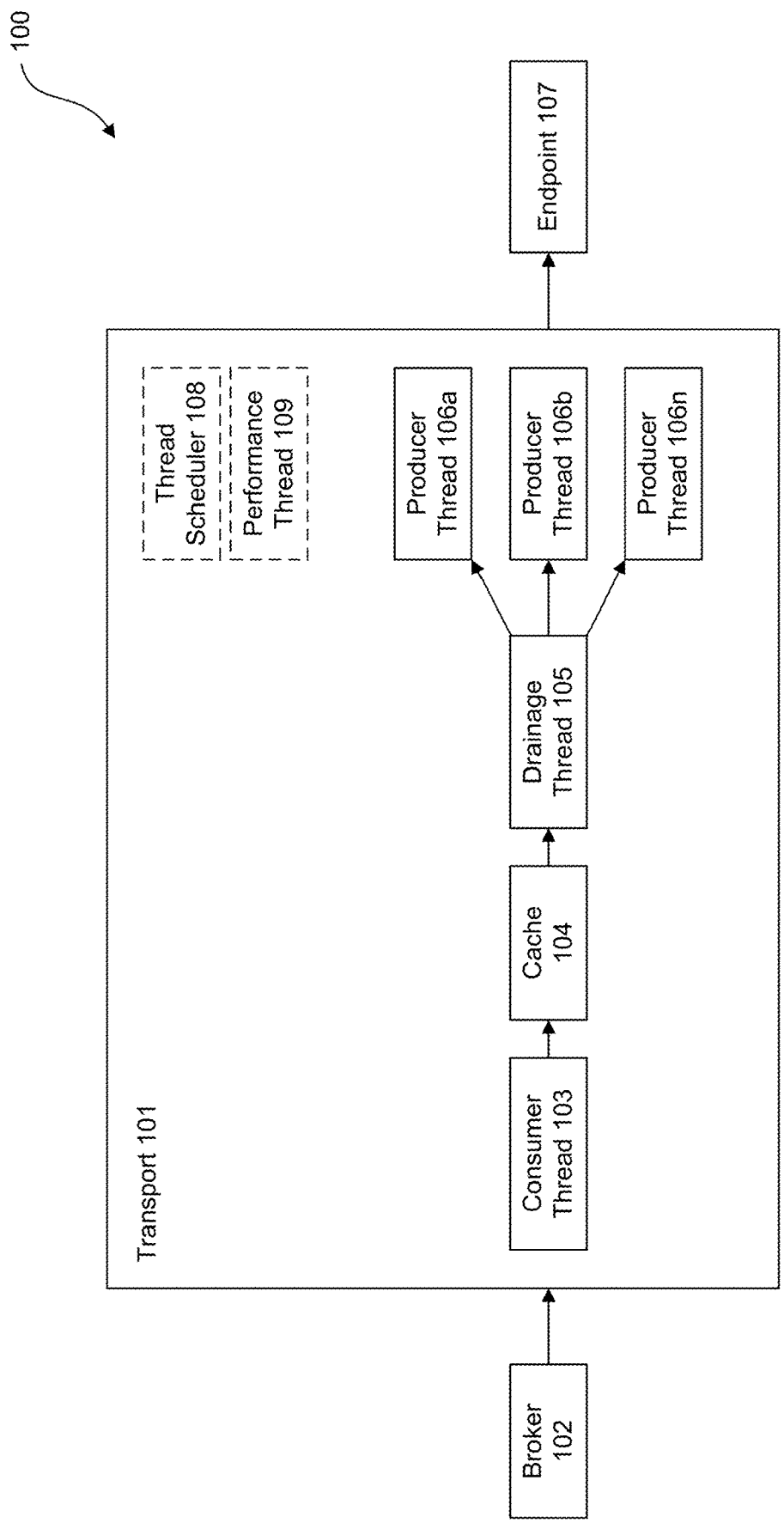
FIG. 1 is a block diagram illustrating a message flow system, according to an embodiment.

In the drawings, the left-most digit(s) of a reference number generally identifies the drawing in which the reference number first appears.

DETAILED DESCRIPTION

The rates messages arrive at a transport and the rates messages are directed to an appropriate endpoint can vary greatly. Current transport systems and methods do not effectively account for the variability of message rates, so existing systems and methods cannot proactively correct imbalances. Instead, system administrators must react to issues. In contrast to the systems and methods previously in the field, the system and method disclosed herein maintains a balanced flow of data to and from the transport.

To maintain a balanced flow, a system and method should have a normal pressure differential at its endpoints. A normal pressure differential means that the ratio of the rate of a transport's inflow to its outflow is in unity, thus attaining equilibrium. The initial parameters of a transport system are based on a series of efficiency tests. Efficiency can be defined using the following equation, where $R_C(t)$ is the rate-function of consumption and $R_P(t)$ is the rate-function of production, with a production thread count operating within the nominal range of optimal.

$$\frac{R_C(t)}{R_P(t)} \approx 1$$

When the rate function of consumption and the rate-function of production are substantially in equilibrium, the transport has a normal pressure differential. However, the rate-function of consumption and the rate-function of production are not always in equilibrium. When the system becomes unbalanced, issues arise that prevent optimum transport of messages.

When production at a transport is higher than consumption at a transport $$\left(\text{i.e. } \frac{R_C(t)}{R_P(t)} < 1\right)$$

threads are inactive and waiting for work. In such instances, efficiency and response time are degraded, and the transport underutilizes resources.

When production at a transport is lower than consumption at a transport $$\left(\text{i.e. } \frac{R_C(t)}{R_P(t)} > 1\right)$$

the number of producer threads cannot keep up with consumption, and the system is in danger of running out of cache memory, running out of heap storage, running out of backup disk space, degrading system performance, and even possible catastrophic failure of the transporter.

To combat both imbalances and keep the message flow at an optimal rate, the adaptive transport system and method adaptively and dynamically adjusts the system according to the system's current or future needs. The method and system manages the inflow and outflow of a transport through a feedback loop to continuously monitor a pressure differential. As system conditions vary throughout time, the method and system's adaptive and dynamic adjustability keeps the pressure differential substantially even.

The terms "consumer" and "producer" are from the perspective of a transport. Messages are consumed at a transport, and messages are produced at a transport. Messages include any form of data messages, including texts, pictures, audio, video, etc.

Systems to proactively adjust a transport system are disclosed. Methods of use and computer-readable medium embodiments are also disclosed. Further embodiments and features, as well as the structure and operation of the various embodiments, are described in detail below with reference to accompanying drawings.

Based on the teachings contained in this disclosure, a person skilled in the relevant art will find apparent how to make and use the technology using transport systems, computer systems, or computer architectures other than that shown in the Figures. In particular, embodiments may operate with software, firmware, hardware, or operating system implementations other than those described herein.

FIG. 1 is a block diagram illustrating a message flow system (100), according to an embodiment. The message flow system (100) comprises a transport (101), a broker (102) that provides messages to the transport (101), and an endpoint (107). The transport (101) comprises the following blocks: a consumer thread (103), a cache (104), a drainage thread (105), and producer threads (106a, 106b, 106n). The transport (101) also comprise a thread scheduler (108) and a performance thread (109). The transport (101) can also comprise other threads not shown in FIG. 1. The message flow system (100) is one embodiment, and the number of elements can vary. For example, messages can enter the transport (101) through more than one consumer thread (103) or through partitioning, the producer threads (106) can be more or less in number, and the broker (102) and the endpoint (107) can range from one to many. Additionally, the broker (102), the transport (101), and the endpoint (107) can be spread over multiple machines, servers, processors, etc.

In the embodiment depicted in FIG. 1, the inflow to the transport is based on ingesting messages from a topic provided by the broker (102). Data is stored in topics, and the topics can be split into partitions where the messages are ordered. When the consumer thread (103) ingests messages from the broker (102), the messages are consumed and placed in the cache (104) within an address space of the transport (101). The messages can then be packaged for the endpoint (107).

In this embodiment, the transport (101) ingests the messages as fast as the messages can be queued. But in other embodiments, the cache (104) is read at fixed intervals based on initial configuration parameters. While the cache (104) fills up with the messages (e.g. warms up), the drainage thread (105) periodically wakes up to determine when the cache (104) should be consumed. Attempting to immediately consume messages as the messages arrive at the transport (101) is inefficient. The basis for not immediately consuming the cache (104) arises from many factors, including for example: the message endpoint (107); the optimal number of the producer threads (106); efficiency of thread pooling and the thread scheduler (108); and the programmatic decisions around thread inactivity, load on the system, and other subsystems concurrently running in the same address space (e.g. self-monitoring, metric collection, etc.). Since attempting to immediately consume messages is inefficient, a thread pool can be established. A transport typically has many threads operating within the transport. A transport can also have multiple threads operating simultaneously. Here, thread scheduler (108) allocates time slices for each thread based on thread affinity, although other thread scheduling methods can be used.

The initial load of the cache (104) is the warm-up period prior to draining. For the transport (101) to start producing the producer threads (106), a gradual increase or decrease of interval time (i.e. the time before the next iteration of stored messages in the cache (104) is read) can be instituted until a configured interval is established and a steady running state is achieved. The interval can also be governed by a size of the cache (104) (i.e. the size megabits, gigabits, etc.) that correlates to drainage time. At the end of each interval (governed by time, size, or both), the drainage thread (105) accesses the cache (104) and consumes all extant messages. The cache (104) is cleared and allowed to continue filling.

The drainage thread (105) can then allocate the messages to the producer threads (106) based on a predetermined optimal thread count. Existing producer threads (106) are utilized. New threads can be spawned via a cached thread pool mechanism or the thread scheduler (108), allowing threads greater than the optimum number to be constructed. However, recreating a series of threads every iteration is inefficient. Additionally or alternatively, the transport (101) can transform the messages. For example, the transport (101) can transform a message body or enrich a message body.

Many factors determine the number of threads that can concurrently act within a system without performance degradation (e.g. number of cores, additional load on the system, memory, etc.). From many observations and extensive testing, twice the optimal thread count does not appreciably reduce or increase throughput. However, given the constraints of message size and consumer/producer endpoints (e.g. 22 K messages per second and 4 K message size), the message flow system (100) trends towards an unstable condition when a thread count exceeds twice the optimal thread count. Therefore, while the number of the producer threads (106) remains in the range from the optimum thread count to substantially twice the optimum thread count, the message flow system (100) is considered stable. Following utilization of the producer threads (106), the transport (101) sends the messages to the endpoint (107).

Figure 2:
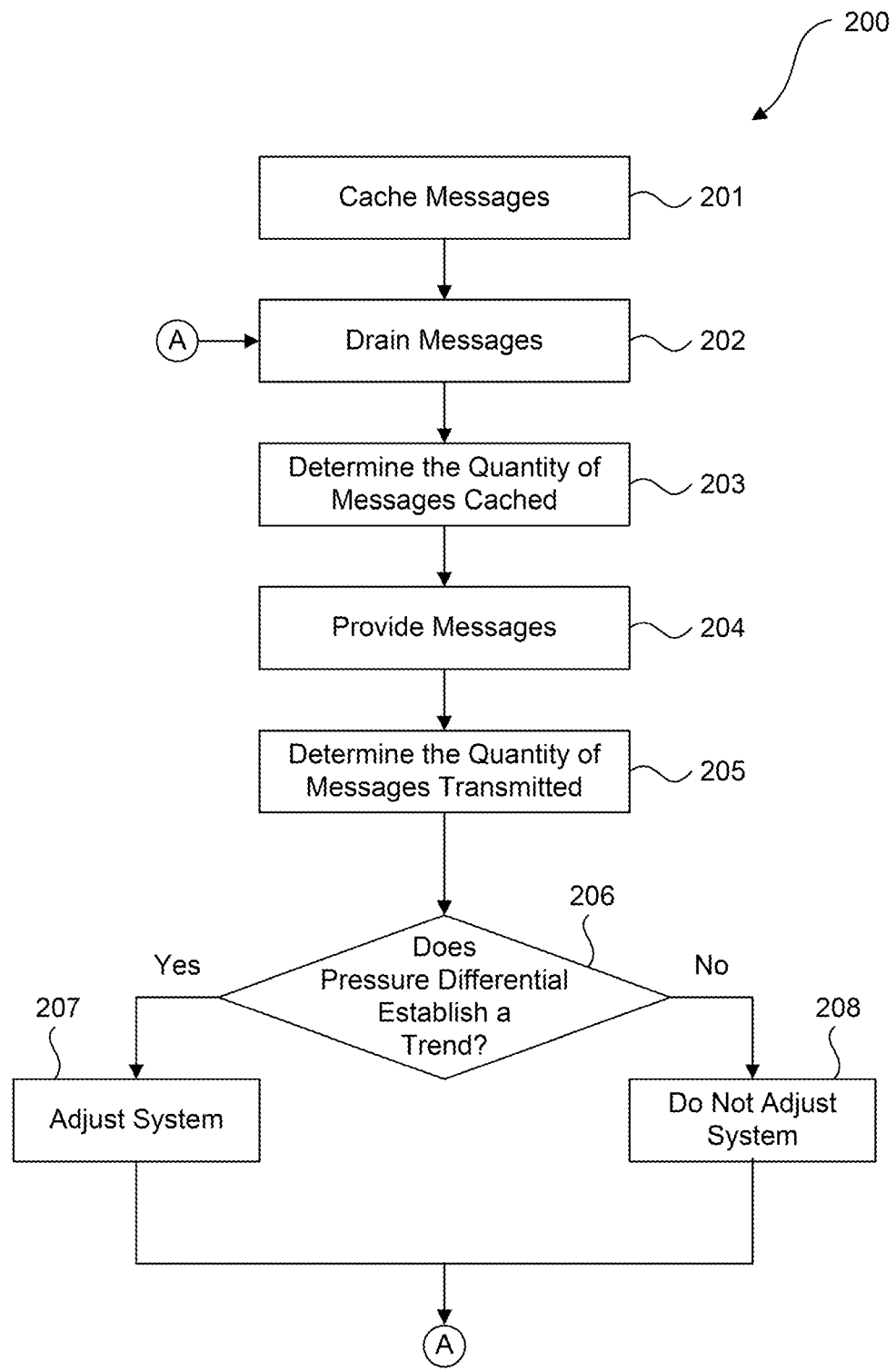
FIG. 2 is a flow diagram of a method to dynamically adjust a transport system, according to an embodiment.

FIG. 2 is a flow diagram of a method (200) to dynamically adjust a transport system, such as the transport (101), according to an embodiment. The method (200) as described herein relates steps to the message flow system (100) of FIG. 1. The application of the method (200), however, is not so limited and the relation to FIG. 1 is only provided for means of understanding a particular embodiment.

The method (200) begins at step (201) where the cache (104) is filled with message data from the broker (102). Next, step (202) includes draining the message data from the cache (104). For example, the drainage thread (105) drains the cache (104) when a byte count has reached a preconfigured threshold. To determine when the byte count has reached the preconfigured threshold, a preconfigured message count is used. In an embodiment, the preconfigured message count is read from a configuration file.

Step (203) includes determining a quantity of messages cached over at least one iteration of time. The quantity of messages can be expressed as the cumulative size of the messages in bytes or as the number of messages. The number of messages can also determine the buffer size drained based on an average message size. The average message size can either be determined during operation or known in advance. In at least one embodiment, when a first set of messages equaling a preconfigured number enter the cache (104), the average message size is determined.

Step (204) includes transmitting or otherwise providing the messages to the endpoint (107). Step (205) includes determining a quantity of messages transmitted or otherwise provided by the transport (101) over the at least one iteration of time. As was the case for determining the quantity of messages drained from the cache (104), the quantity of messages drained can be the cumulative size of the messages in bytes or the number of messages.

Step (206) includes calculating a pressure differential over the at least one iteration of time and determining whether the pressure differential, along with pressure differentials from previous iterations, establishes a trend. As a non-limiting example, the pressure differential may be calculated from measurements taken in steps (203) and (205). From the pressure differential measurement, along with nine previous pressure differential measurements, a determination is made as to whether a trend is established.

If the pressure differential, along with the pressure differentials from previous iterations, does not establish a trend, the transport (101) is not adjusted (step (208)). The method (200) loops back to step (202) where the messages stored in the cache (104) are again drained. If at step (206) the pressure differential, along with the pressure differentials from previous iterations, does establish a trend, the transport (101) is adjusted during step (207) to correct for any imbalances.

For example, in one embodiment, the producer threads (106) are adjusted to increase or decrease in number. Additionally or alternatively, the amount of information stored in the cache (104) is increased or decreased prior to a subsequent draining. The transport (101) could also be adjusted by increasing or decreasing the size of the cache (104) or the amount of time the drainage thread (105) waits before draining the cache (104). Following the adjustment at step (207), the method (200) loops back to step (202) where the messages stored in the cache (104) are again drained.

At step (206), trend data is used to determine whether the pressure differential is substantially even. For example, in certain embodiments, a moving average of each successive iteration is calculated along with a relative difference. For the purpose of calculating moving averages of transport consumption and transport production, $R_{ci}(t)$ equals a quantity of messages in the cache (104) for the ith iteration divided by the amount of time to fill and drain the cache (104). $R_{pi}(t)$ equals a quantity of messages transmitted or otherwise provided by the transport (101) for the ith iteration divided the amount of time for all the producer threads (106) to send their respective messages.

The respective averages are then calculated over n iterations by accounting for the messages in the cache (104) for a number of iterations or the messages sent to the endpoint (107) for a number of iterations. The respective averages of the consumer and the producer aspects of the transport can be calculated using the following equations:

$$R_{c\ avg} = \sum_{n=1}^{10}(R_{cn}(t))/10$$

$$R_{p\ avg} = \sum_{n=1}^{10}(R_{pn}(t))/10$$

The concept of iteration in this embodiment is defined to mean one cache drain of the cache (104) to the drainage thread (105). Thus, $R_{c\ avg}$ for the sample embodiment shown above represents the average rate at which the consumer thread (103) is capable of filling the cache (104) over ten iterations. The producer threads (106) also have an average rate over those same ten iterations, namely $R_{p\ avg}$.

To establish the moving averages for consumption and production over a number of iterations, the equations for the moving averages, according to an embodiment, are:

$$R_{C\ avg} = \frac{\left[\sum_{n=1}^{10}(R_{cn})\right] - R_{C1} + R_{c(latest)}}{10}$$

$$R_{P\ avg} = \frac{\left[\sum_{n=1}^{10}(R_{pn})\right] - R_{p1} + R_{p(latest)}}{10}$$

Figure 3A:
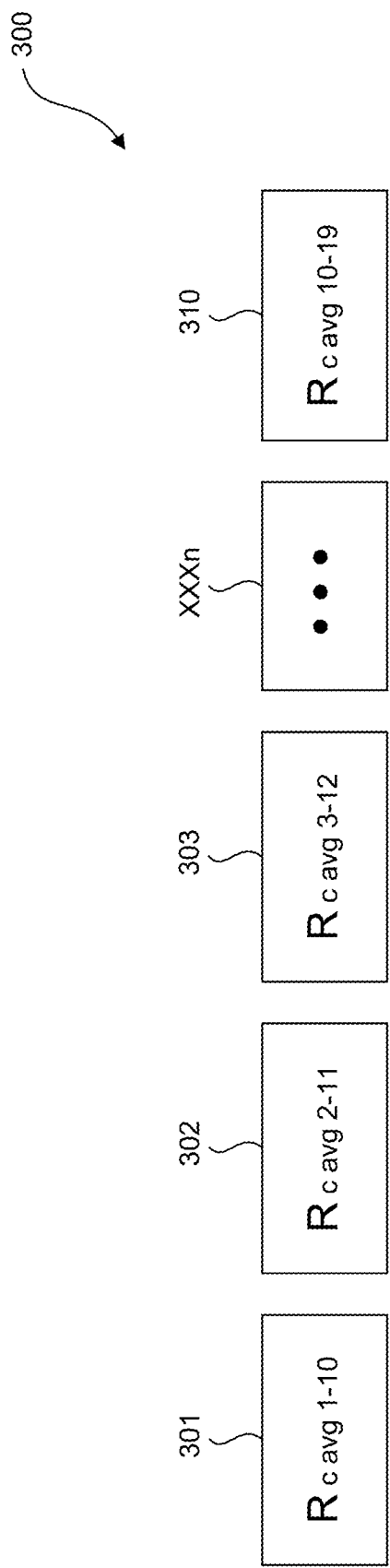
FIG. 3a is a diagram of a moving average for a consumption rate over a number of iterations, according to an embodiment.
Figure 3B:
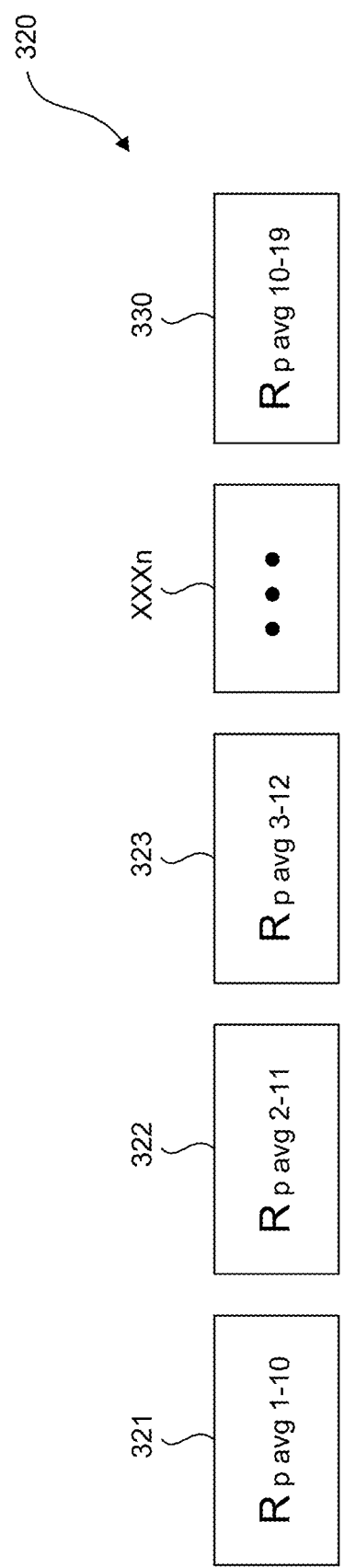
FIG. 3b is a diagram of a moving average for a production rate over a number of iterations, according to an embodiment.

FIG. 3a is a diagram of a moving average for a consumption rate over a number of iterations (300), according to an embodiment. FIG. 3b is a diagram of a moving average for a production rate over a number of iterations (320), according to an embodiment. FIG. 3a includes an average rate of consumption for iterations 1-10 (301), iterations 2-11 (302), iterations 3-12 (303), iterations 4-18 (represented by n), and iterations 10-19 (310). Similarly, FIG. 3b includes an average rate of production for iterations 1-10 (321), iterations 2-11 (322), iterations 3-12 (323), iterations 4-18 (represented by n), and iterations 10-19 (330). FIGS. 3a and 3b both show the use of a sliding window moved along by one iteration at a time, but the calculation of the moving average should not be so limited. Other embodiments can utilize other approaches, iteration ranges, or sliding scales to gather multiple average producer rates and average consumer rates.

Now referring back to FIG. 2, it can be determined as to how much to adjust the transport (101) when calculating whether the pressure differential is substantially even at step (206). The amount of adjustment depends on the difference between the rate of consumption and the rate of production. The index for the difference in the moving average of each successive iteration is demonstrated by the equation $\Delta R_d = R_{p\ avg} - R_{c\ avg}$ where d represents the index for the difference in the moving average of each successive iteration of the set. The following table includes the calculation for multiple iterations, according to this embodiment.

| d | Iteration Set | $\Delta R_d$ |
|---|---|---|
| 1 | 1-10 | $R_{p\ avg\ (1-10)} - R_{c\ avg\ (1-10)}$ |
| 2 | 2-11 | $R_{p\ avg\ (2-11)} - R_{c\ avg\ (2-11)}$ |
| ... | ... | ... |
| n | n → (9 + n) | $R_{p\ avg\ n\ (9+n)} - R_{c\ avg\ n\ (9+n)}$ |

An embodiment of the system can use the index to calculate the relative difference (Dτ) and determine how much the transport (101) is imbalanced. Based on a Dτ deviation and a polarity (i.e. whether the consumer is waiting for work or the producer is over producing), the system can be adjusted accordingly at step (207) (e.g. memory cache is increased or decreased in size or producer threads adjusted).

The relative difference is defined in at least one embodiment as follows:

$$D\tau = \frac{\Delta R_d}{\left|\frac{R_{P\ avg} + R_{C\ avg}}{2}\right|}$$

Polarity indicates whether the transport (101) is over consuming or over producing. In the above embodiment, the relative difference indicates polarity through the difference in the moving average of each successive iteration ($\Delta R_d$), but other embodiments can use alternative approaches to indicate polarity.

A pre-set tolerance can determine whether an imbalance between consumption and production is substantial to constitute dynamically adapting the transport (101). As an example embodiment, any $D\tau \leq -0.20$ or $D\tau \geq 0.20$ represents an area of concern and acts as feedback when adjusting or altering the transport (101). Other embodiments, however, can set tolerances differently, including setting a positive polarity tolerance at a different value than a negative polarity tolerance. When the pressure differential, along with the pressure differentials from previous iterations, establishes a trend, the transport (101) is accordingly adjusted at step (207). Following the adjustment, method (200) loops back to step (202) where messages stored in the cache (104) are again drained.

Certain embodiments also account for artificial oscillations. As the pressure differential is driven to a point of stability (e.g. a substantially even or normal pressure differential), adjustments are curtailed. In these instances, the transport (101) waits to see if the system remains stable or if a trend continues during successive iterations. Thus, not all embodiments necessarily adjust the system at the first indication of a trend or completely prevent adjustment at the first indication of stability.

Figure 4:
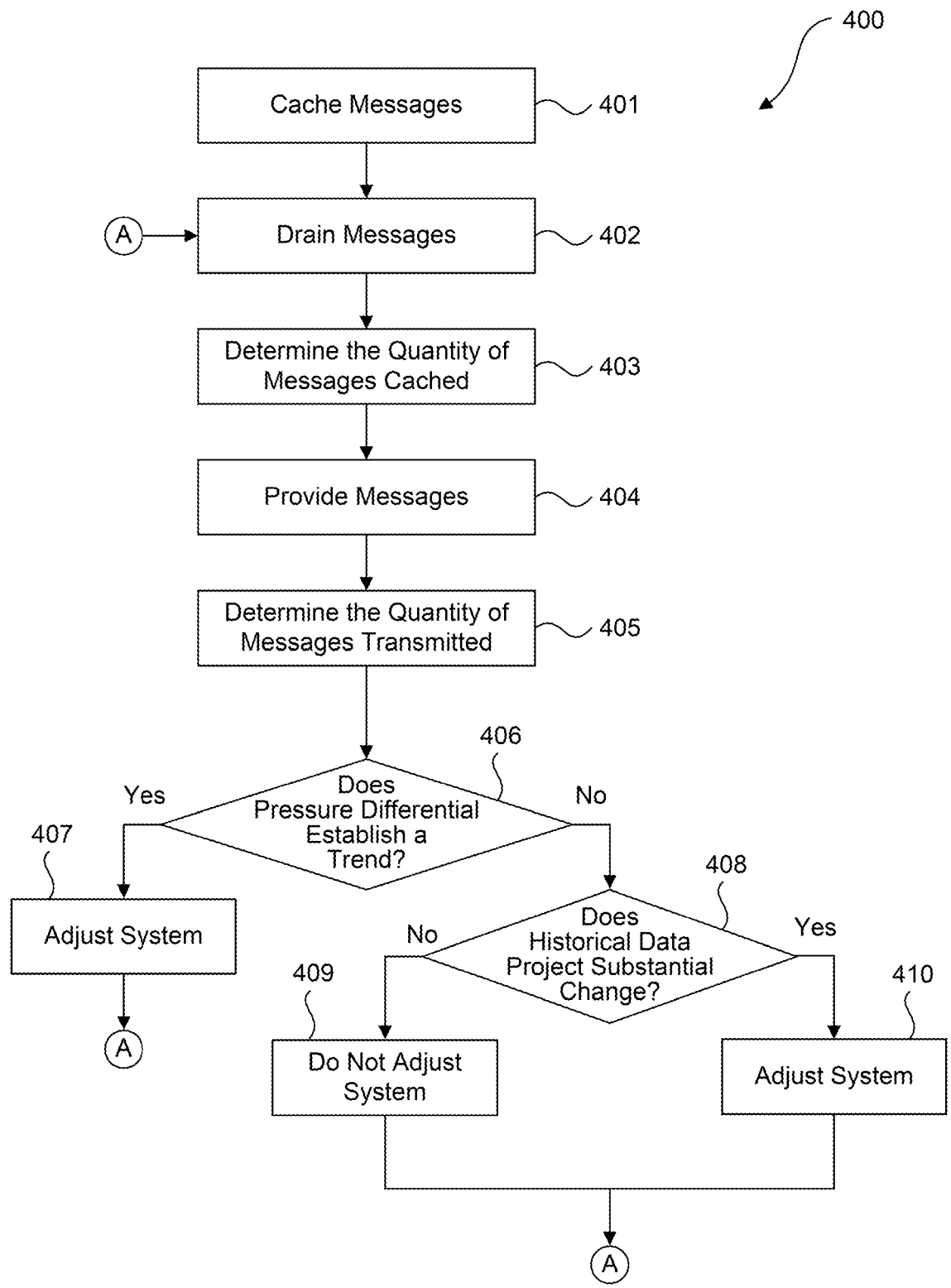
FIG. 4 is a flow diagram of a method to dynamically adjust a transport system using historical data, according to an embodiment.

FIG. 4 is a flow diagram of a method (400) to dynamically adjust a transport system, such as the transport (101), according to an embodiment using historical data. The method (400) begins at step (401) where the cache (104) is filled with message data from the broker (102). Next, step (402) includes draining the messages from the cache (104), step (403) includes determining a quantity of messages drained from the cache (104) over at least one iteration of time, step (404) includes transmitting or otherwise providing the messages to the endpoint (107), and step (405) includes determining a quantity of messages transmitted or otherwise provided by the transport (101) over the at least one iteration of time.

Step (406) includes calculating a pressure differential over the at least one iteration of time and determining whether the pressure differential, along with pressure differentials from previous iterations, establishes a trend. If the pressure differential, along with the pressure differentials from previous iterations, establishes a trend, the transport (101) is adjusted at step (407) to correct for any imbalances. Although not explicitly shown in FIG. 4, adjusting the transport (101) during step (407) can also take into account historical data to balance pressure differential for successive iterations. Use of historical data can be advantageous for the transport (101) to predict future changes. For example, historical data could foresee an increase or decrease in incoming messages to the transport (101) based on prior recorded trends or prior periods of time when either consumption or production was atypically high or low. Such data could thus be utilized to proactively adjust the transport 101, even if the pressure differential is currently balanced.

If at step (406) the pressure differential, along with the pressure differentials from previous iterations, does not establish a trend, it is determined whether historical data projects a substantial change to the pressure differential. If a substantial change in pressure differential is projected based on historical data at step (408), the transport (101) is adjusted at step (410) to correct for any projected imbalances. Following the adjustment at step (410), method (400) loops back to step (402) where messages stored in the cache (101) are again drained.

If at step (408) a substantial change in pressure differential is not projected based on historical data, the transport (101) is not adjusted and method (400) loops back to step (402) where messages stored in the cache (101) are again drained.

The methods (200) and (400) illustrate example embodiments to dynamically adjust a transport system. These examples are provided for the purpose of illustration only and are not limiting. Further, any variations or improvements that would be apparent to a person of skill in the art based on the teachings herein are also within the scope of the embodiments of the disclosure. Also, the equations above are non-limiting examples and only show certain embodiments for calculating trend data.

Active Threads Above and Below the Optimum Thread Range

The message rates drive the system and method. However in at least one embodiment, a secondary trigger on the system or method is the average thread counts over a set of iterations. The concern about thread count averages arises when the message rates are within the range of relative difference ($D\tau$). When the message rates are within the range of relative difference, the thread count should also be kept within the range of stability to keep the pressure differential substantially in equilibrium.

The optimal thread count for production is determined by the number of active central processing unit (CPU) cores capable of processing the transport code, whether the cores support hyperthreading, the message size, and the available memory. A message flow system is considered stable when the thread count does not exceed twice the optimal thread count. When the thread count exceeds twice the optimal thread count over a set of iterations (e.g. 80%), a separate performance thread can be used. The performance thread can throttle the producer until the thread count falls back to the optimum level, and a notification of persistent out-of-bound thread counts could take place to proactively manage potential transport service degradation.

Embodiments of the system or method can also adjust for threads that are less than the optimum number over a set of iterations. When threads are less than the optimum number, worker threads in the pool are underutilized. When the average of the active thread count within a set of iterations goes below the optimum number, decreasing the quantity of messages in the memory buffer prior to consumption, for example by ten percent, helps to adjust the number of worker threads to move the system back into efficiency.

The performance thread manages notification and logging. The performance thread looks at the percentage of times within a set of iterations that the active thread count goes above twice the optimum number or significantly lower than the optimum number. The main purpose of the performance thread is to throttle the producer, notify, and log. The performance thread generally does not attempt to remediate but is typically used to prevent catastrophic failure of the transport's heap. Remediation is preferably left to the adaptive system or method.

Thread Scheduling

When many threads are operating in the system, a thread scheduler minimizes thread context switching. In doing so, one or more threads can enter a wait state for other threads to access more of the CPU. Two different methods can be used: precise and bracketing.

During the precise method of thread scheduling, a producer thread can communicate with a drainage thread, for example through a shared memory or synchronization. Through communication, the producer thread can notify the drainage thread when a cache is about to fill up or a configured amount of messages in the cache is about to be reached. The drainage thread can then lock, map, clear, and unlock the cache. The precise method of thread scheduling provides trend analysis and improved feedback for the system or method.

During the bracketing method of thread scheduling, the drainage thread can manage on its own by estimating the time needed to wait before consuming the memory cache. However if the quantity of messages in the memory buffer prior to draining is sufficiently less than an initially configured value, the amount of time the drainage thread remains in a wait state prior to checking the memory buffer is decreased because, for example, the method and system has tuned the quantity of messages based on trend analysis. If the wait time for the drainage thread is too coarse, the quantity of messages in the memory buffer will exceed the desired number. Depending on the fill rate and time that the drainage thread is waiting, this could have a significant impact on the ability to maintain stability and maximize throughput. Accordingly, wait times are instituted such that the wait time is a small percentage (e.g. 15%) of the production rate. For example, if the producer fills a buffer to $5 \times 10^5$ messages with an average message size of 2 k in twenty-five seconds, the drainage thread wait time should be fifteen percent of twenty-five seconds or 3,750 milliseconds. Given a fifteen percent comparative wait time, on average the system or method results in seven percent excess messages in the buffer, which is within a ten percent threshold.

Figure 5:
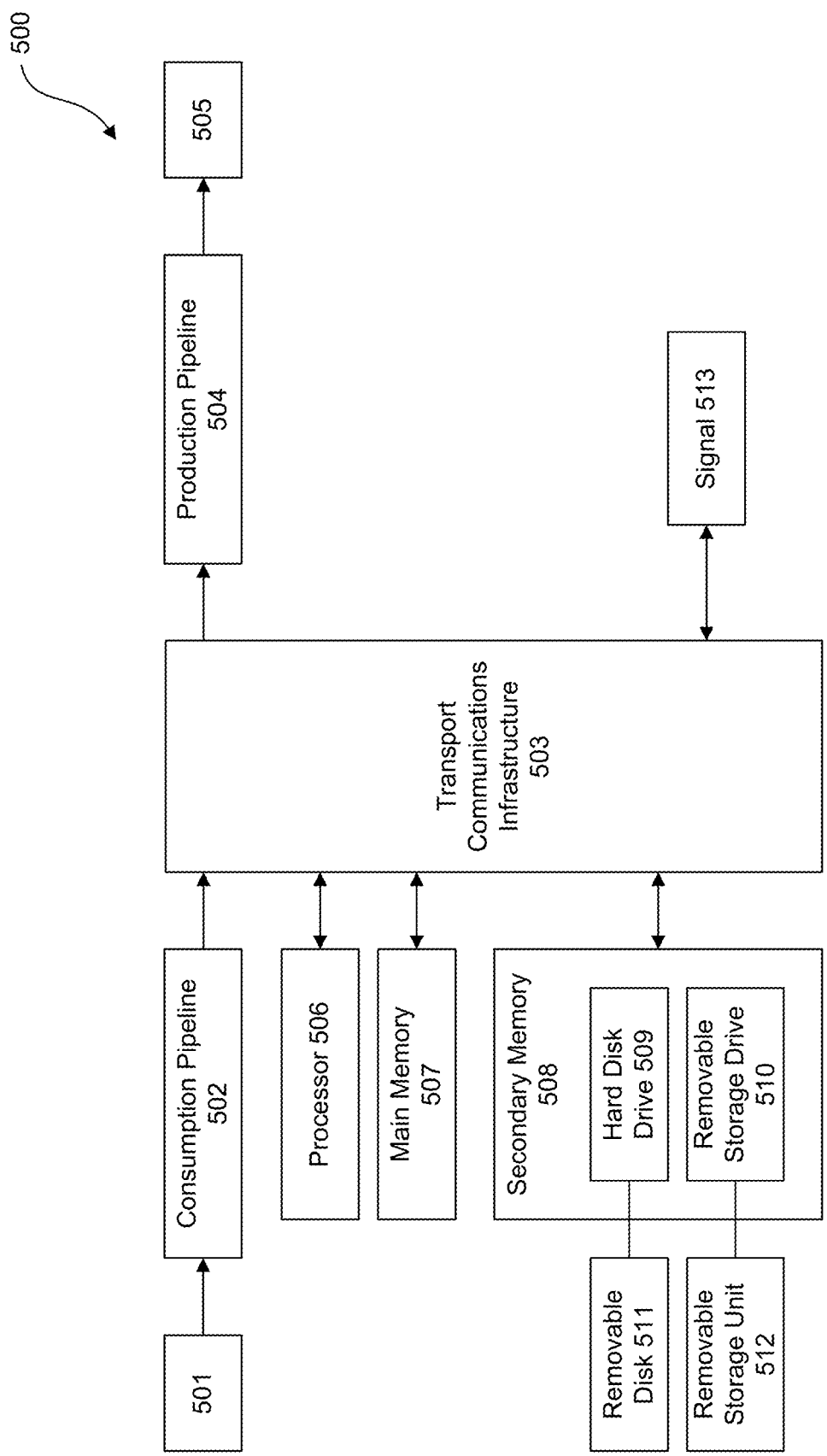
FIG. 5 is a schematic diagram of an example computer system used to implement embodiments of the method, according to an embodiment.

FIG. 5 is a schematic diagram of an example computer system (500) used to implement embodiments of the adaptive system to dynamically adjust message rates through a transport. Aspects of the various embodiments can be implemented by software, firmware, hardware, or a combination thereof. Various embodiments are described in terms of this example computer system (500). After reading this description, it will become apparent to a person of ordinary skill in the art how to implement embodiments using other computer systems or computer architectures.

The computer system (500) includes at least one processor, such as a processor (506). The processor (506) can be a special purpose or a general processor, and the processor (506) is connected to a transport communication infrastructure (503).

The computer system (500) includes a consumption pipeline (502). The consumption pipeline (502) has an input (501) to receive messages from a broker and enables messages to be transferred from the broker to the transport communications infrastructure (503). The computer system (500) also includes a production pipeline (504) to transport messages from the transport communications infrastructure (503) to an output (505). The production pipeline 304 enables messages to be received at an endpoint, and the endpoint includes devices such as, but not limited to, a desktop computer, laptop computer, cellphone, tablet, or any other device capable of receiving electronic messages.

The computer system (500) also includes a main memory (507) and may also include a secondary memory (508). The main memory (507) may include programmed instructions for the processor (506), and the main memory (507) may include one or more levels of cache where messages can be temporarily stored. The secondary memory (508) may include, for example, a hard disk drive (509) or a removable storage drive (510). The hard disk drive (509) reads from and writes to a removable disk (511). The removable storage drive (510) may comprise an optical disk drive, a flash memory drive, or a different medium capable of recording and reading data on a storage medium. The removable storage drive (510) reads from and writes to a removable storage unit (512), and the removable storage unit (512) may comprise an optical disk, a flash memory stick, or a different means capable of saving data. As will be appreciated by persons skilled in the relevant art, the removable disk (511) and the removable storage unit (512) include a tangible computer readable storage medium having stored thereon message data, computer software, or other forms of code. Additionally, the removable disk (511) or the removable storage unit (512) may be rewritable, either manually or at selected and predetermined intervals.

Computer programs (also called computer control logic) represent controllers of the computer system (500). Where embodiments are implemented using software or firmware programs, the programs may be stored in a computer program product and loaded into the computer system (500). For example, computer programs may be loaded into the computer system (500) using the removal disk (511), the removable storage unit (512), the hard disk drive (509), the removable storage drive (510), Ethernet, a wireless signal, or an alternative extrinsic source. The computer programs can also be stored in the main memory (507).

The processor (506) may receive the computer programs from the main memory (507), the secondary memory (508), or an extrinsic source. Such computer programs, when executed, enable the computer system (500) to implement embodiments as discussed herein. In particular, the computer programs, when executed, enable the computer system (500) to dynamically adjust message rates through a transport so as to keep a substantially even pressure differential at the consumption pipeline (502) and the production pipeline (504). Without the computer programs implementing the methods described herein, the computer system (500) is more susceptible to failure due to pressure imbalance.

Certain embodiments of the computer system (500) may also store various values in an object map located in the secondary memory (508). The object map may include stored values such as but not limited to the average number of active threads over a period of iterations, relative difference, moving average of the producer, moving average of the consumer, and relative difference of consumption and production, including polarity. If a percentage of the relative difference is greater than a configured threshold, objects are filtered out and the average of $$\frac{D\tau}{n}$$

can be stored where n is the number of elements that exceeded a threshold. Further, the current configured size of the memory cache can also be stored.

Certain embodiments of the computer system (500) include a signal (513). The signal (513) indicates systemic and persistent deviations in the message rates running through the computer system (500). The signal (513) can also indicate when conditions show that the system cannot fully correct an imbalance by itself. Deviations can be calculated by the processor (506) and by using a pre-set threshold message rate or ratio.

The signal (513) can be in the form of an alert or an alarm. The alert or alarm gives system administrators an opportunity to proactively prevent system failure or imbalance. In select embodiments, the alert or alarm is only sent when the computer system (500) cannot fully correct the deviation on its own. Select embodiments may also send the alert or alarm in expectation of a deviation. The signal (513) can be a light emitting diode, a message displayed over a user interface, a auditory signal, or other signal indicator.

Described above are systems, apparatuses, and methods to dynamically adjust message rates through a transport, and applications thereof. It is to be appreciated that the Detailed Description section, and not the Abstract, is intended to be used to interpret the claims. The Abstract may set forth one or more but not all exemplary embodiments of the present technology as contemplated by the inventors, and thus, is not intended to limit the claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the technology that others can, by applying knowledge within the skill of the art, readily modify or adapt for various applications such specific embodiments, without undue experimentation, without departing from the general concept of the present technology. Therefore, such adaptations and modifications are intended to be within the meaning and range of equivalents of the disclosed embodiments, based on the teaching a guidance presented herein. It is to be understood that the phraseology or terminology herein is for the purpose of description and not of limitation, such that the phraseology or terminology of the present specification is to be interpreted by a skilled artisan in light of the teachings and guidance.

The breadth and scope of the present technology should not be limited by any of the above-described exemplary embodiments, but should be defined only in accordance with the following claims and their equivalents.

What is claimed is:

1. An adaptive transport system, comprising:
   a cache configured to store messages; and
   at least one processor configured with:
     a consumer thread that receives the messages at a consumption rate and stores the messages in the cache;
     a drainage thread that drains the messages stored in the cache at a drainage rate; and
     producer threads configured to produce the messages at a production rate,
   wherein the at least one processor is configured to calculate a trend in a pressure differential using: (i) a moving average of the consumption rate that adds a latest rate of consumption and subtracts an earlier rate of consumption and (ii) a moving average of the production rate that adds a latest rate of production and subtracts an earlier rate of production; and
   wherein the at least one processor is further configured to correct data flow imbalances proactively and in response to the trend in the pressure differential.

2. The adaptive transport system of claim 1, wherein the at least one processor is further configured with a thread scheduler that changes the drainage rate proactively to increase or decrease the messages stored in the cache in number based on the trend in the pressure differential.

3. The adaptive transport system of claim 1, wherein the at least one processor is further configured with a thread scheduler that changes the drainage rate proactively to increase or decrease the messages stored in the cache in size based on the trend in the pressure differential.

4. The adaptive transport system of claim 1, wherein the cache is further configured to increase or decrease in size proactively based on the trend in the pressure differential.

5. The adaptive transport system of claim 1, wherein the at least one processor is further configured to increase or decrease the producer threads in number proactively based on the trend in the pressure differential.

6. The adaptive transport system of claim 5, wherein the at least one processor is further configured to increase or decrease the producer threads in number proactively based on number of active central processing unit (CPU) cores and whether the active CPU cores support hyperthreading.

7. The adaptive transport system of claim 1, wherein the at least one processor is further configured with a performance thread that throttles the producer threads and maintains a log of dynamic changes to the producer threads.

8. The adaptive transport system of claim 1, wherein the at least one processor is further configured to calculate a relative difference between the consumption rate and the production rate and a corresponding polarity.

9. The adaptive transport system of claim 8, wherein the at least one processor is further configured to adjust the producer threads in number proactively based on the trend in the pressure differential, the relative difference, and the corresponding polarity.

10. The adaptive transport system of claim 8, wherein the at least one processor is further configured to adjust the drainage rate proactively based on the trend in the pressure differential, the relative difference, and the corresponding polarity.

11. A method of adapting a transport proactively, comprising:
    receiving messages at a consumption rate;
    storing the received messages in a cache;
    draining the messages from the cache at a drainage rate;
    providing the drained messages to producer threads;
    producing the messages at a production rate;
    calculating a trend in a pressure differential using: (i) a moving average of the consumption rate that adds a latest rate of consumption and subtracts an earlier rate of consumption and (ii) a moving average of the production rate that adds a latest rate of production and subtracts an earlier rate of production; and
    correcting data flow imbalances proactively and in response to the trend in the pressure differential.

12. The method of claim 11, further comprising: changing the drainage rate proactively to increase or decrease the messages stored in the cache in number based on the trend in the pressure differential.

13. The method of claim 11, further comprising: changing the drainage rate proactively to increase or decrease the messages stored in the cache in size based on the trend in the pressure differential.

14. The method of claim 11, further comprising: changing the cache's size proactively based on the trend in the pressure differential.

15. The method of claim 11, further comprising: increasing or decreasing the producer threads proactively based on the trend in the pressure differential.

16. The method of claim 15, wherein increasing or decreasing the producer threads proactively is also based on number of active central processing unit (CPU) cores and whether the active CPU cores support hyperthreading.

17. The method of claim 11, further comprising: throttling the producer threads and maintaining a log of dynamic changes to the producer threads.

18. The method of claim 11, further comprising: calculating a relative difference between the consumption rate and the production rate and a corresponding polarity.

19. The method of claim 18, further comprising:
increasing the cache in size based on the relative difference and the corresponding polarity;
decreasing the cache in size based on the relative difference and the corresponding polarity;
increasing the producer threads based on the relative difference and the corresponding polarity; and/or
decreasing the producer threads based on the relative difference and the corresponding polarity.

20. The method of claim 18, further comprising: changing the drainage rate proactively based on the relative difference and the corresponding polarity.

* * * * *